United States Patent

[11] 3,611,865

| [72] | Inventor | Joseph M. Schallert<br>Bridgeton, Mo. |
|---|---|---|
| [21] | Appl. No. | 796,733 |
| [22] | Filed | Feb. 5, 1969 |
| [45] | Patented | Oct. 12, 1971 |
| [73] | Assignee | McDonnell Douglas Corporation<br>St. Louis, Mo. |

[54] AIRCRAFT MOUNT FOR WEAPONS AND OTHER STORES
12 Claims, 7 Drawing Figs.

[52] U.S. Cl. .................................................. 89/1.5 R,
244/129 D, 244/137 R
[51] Int. Cl. ...................................................... F41f 5/02
[50] Field of Search............................................ 89/1.5 D,
1.817; 244/129, 130

[56] References Cited
UNITED STATES PATENTS

| 2,634,656 | 4/1953 | Wollens et al. ................ | 89/1.5 |
| 2,949,060 | 8/1960 | Gantschnigg et al. ........ | 89/1.5 |
| 3,053,488 | 9/1962 | Cox, Jr. ......................... | 244/130 |
| 3,242,808 | 3/1966 | Nelson et al. .................. | 89/1.5 |
| 3,494,247 | 2/1970 | Dilworth et al. ............... | 89/1.5 |

*Primary Examiner*—Samuel W. Engle
*Attorney*—Gravely, Lieder & Woodruff

ABSTRACT: A mount for securing weapons and other stores to an aircraft and including a housing projecting into the aircraft, an ejector rack on the housing for securing a load partially within the housing, and an inflatable seal which engages the load and conforms to its contours. When the load is detached from the rack the seal extends across the cavity formed by the housing and is generally flush with the exterior surface of the aircraft so that an uninterrupted moldline exists.

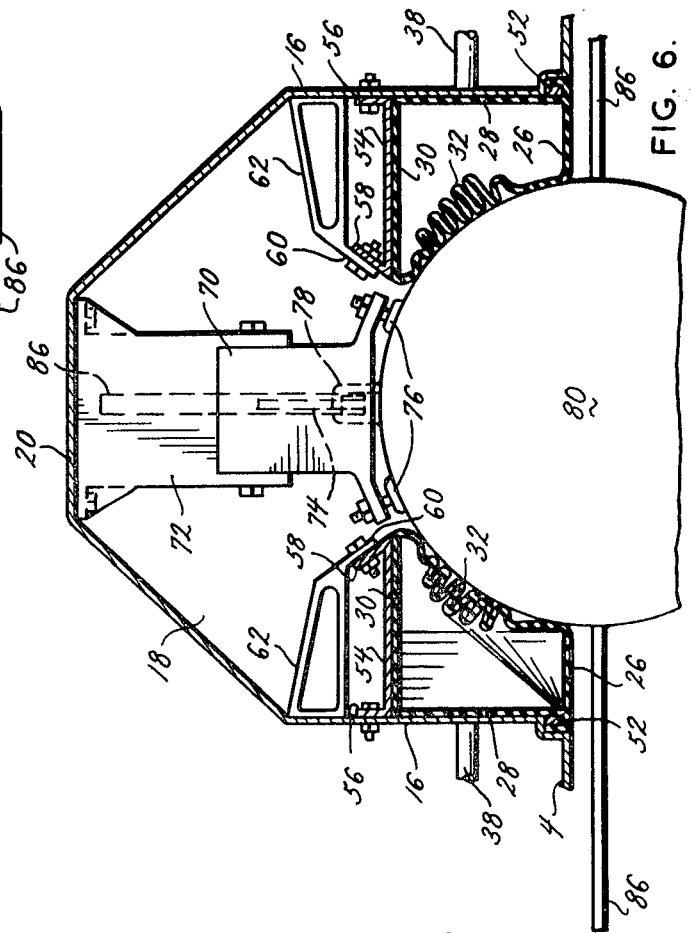

AIRCRAFT MOUNT FOR WEAPONS AND OTHER STORES

This invention relates in general to aircraft and more particularly to mounts for detachable connecting loads to aircraft.

On many types of aircraft rockets and other varieties of armaments are suspended beneath the wing and fuselage on pylons where both the armaments and pylons are fully exposed. The drag produced by the exposed rockets or armaments is considerable, and in the case of high-speed aircraft it has a pronounced effect on the performance of such aircraft. For this reason some high-performance aircraft employ "semisubmerged" or partially recessed mountings in which a portion of the rocket or other armament is recessed into the fuselage. Aside from exposing less of the armament to the air stream, this type of mounting also affords a less abrupt moldline and consequently the drag is reduced considerably when compared to fully exposed mountings. However, once the rocket or other piece of armament is released, a cavity remains in the otherwise smooth surface of the craft, and this cavity induces turbulence and drag and otherwise has a detrimental effect on the performance of the aircraft. Moreover such recesses are generally contoured to conform to the surface of only one type of armament, and once that armament becomes obsolete so does the aircraft. The fact that conventional semisubmerged mountings accept only one type of armament furthermore imposes a severe limitation on the attack capabilities of the aircraft.

One of the principal objects of the present invention is to provide mount for carrying airborne loads in a semisubmerged position on an aircraft. Another object is to provide a mount which does not produce abrupt contours in the moldline of an aircraft once a load has been detached from the mount. A further object is to provide a single mount capable of accommodating loads of different contour and size. An additional object is to provide a mount which propels the load away from the craft once the load is released. Still another object is to provide a mount of the type stated which provides lateral support for the semisubmerged load carried by it so as to reduce the tendency of the load to sway and flutter at high speeds. A further object is to provide a mount of the type stated which is simple in construction and economical to manufacture. These and other objects and advantages will become apparent hereinafter.

The present invention is embodied in a mount including an inwardly extending housing formed in an aircraft, load-securing means for securing a load in the housing such that the load is semisubmerged with respect to the housing, and sealing means for closing the cavity formed by the housing when the load is detached from the load securing means.

The invention also consists in the parts and in the arrangements and combinations of parts hereinafter described and claimed.

In the accompanying drawings which form part of the specification and wherein like numerals and letters refer to like parts whenever they occur:

FIG. 4 is a sectional view taken along line 4—4 of FIG. 3;

FIG. 5 is a sectional view taken along line 5—5 of FIG. 1;

FIG. 6 is a sectional view taken along line 6—6 of FIG. 5; and

FIG. 7 is an enlarged sectional view showing a mounting detail.

Figure 1:
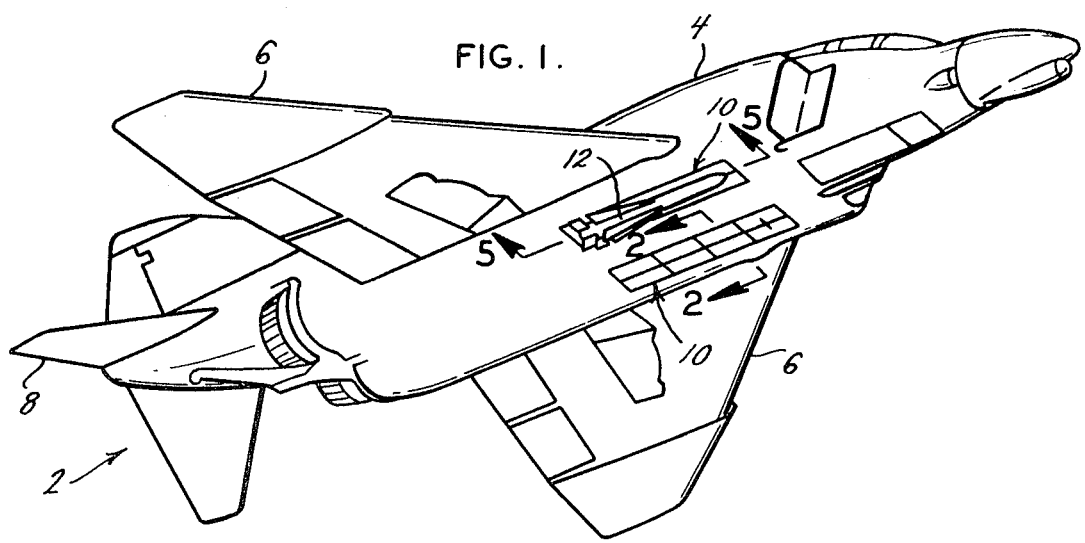
FIG. 1 is a perspective view of an aircraft provided with mounts constructed in accordance with and embodying the present invention.

Referring now in detail to the drawing, 2 designates an aircraft having a fuselage 4, wings 6, and a tail empennage 8. At its underside the fuselage 4 has a plurality of mounts 10 recessed into it, and these mounts 10 carry loads such as rockets 12 or other stores in a semisubmerged position. In other words only a portion of the rocket 12 projects beyond the skin of the fuselage 4, and this presents a relatively smooth moldline which is considerably less abrupt than the moldlines of aircraft having conventional exterior mounts.

Each mount 10 includes a rigid housing 14 which creates an outwardly opening cavity 15 in the fuselage 4, the housing 14 being defined by pairs of sidewalls 16 and end walls 18 which intersect the skin of the fuselage 4 at their lower margins and are connected across their upper margins by a top wall 20. The cavity 15 when not occupied by the rocket 12 is normally closed by opposed sets of longitudinally aligned inflatable seals 22 and 24 which are formed from a flexible elastomeric material so that they may be displaced into the cavity 15 in the presence of the rocket 12 as will presently be explained in greater detail.

Figure 3:
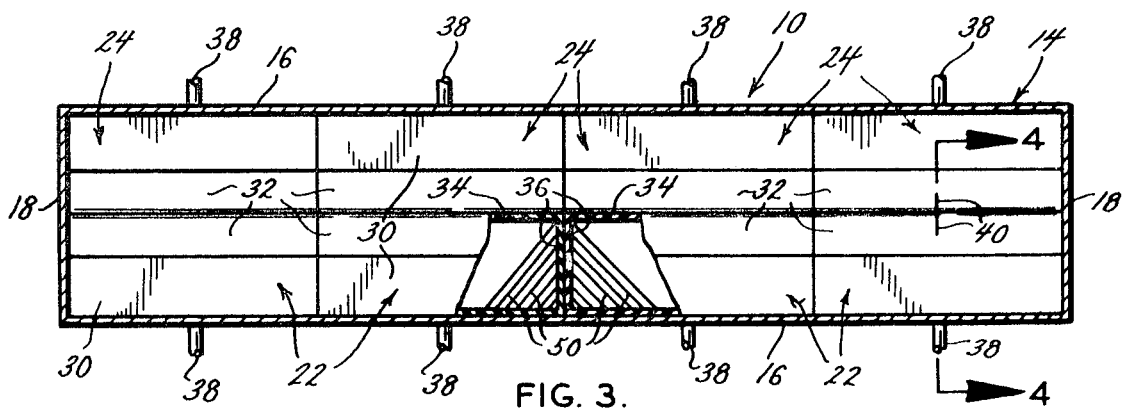
FIG. 3 is a sectional view taken along line 3—3 of FIG. 2.

Each individual seal 22 as well as each seal 24 includes an outwardly presented bottom wall 26 located flush with the skin of the fuselage 4 when not otherwise obstructed, a backwall 28 in facewise abutment with one of the sidewalls 16 of the housing 14, an upper wall 30 located parallel to and in inwardly spaced relation from the bottom wall 26, and an oblique wall interconnecting the inwardly presented margins of the bottom and upper walls 26 and 30. The oblique walls 32 on opposed seals 22 and 24 downwardly converge and merge into their respective bottom walls 26 at arcuate inner edges 34, the edges 34 on opposed seals 22 and 24 engaging one another when not otherwise displaced so that the bottom walls 26 from a generally flat uninterrupted continuation of the fuselage 4 across the cavity 15. Thus, each of the seals 22 and 24 has a generally trapezoidal cross-sectional shape. At the ends of each seal 22 or 24 their walls 26, 28, 30 and 32 are connected by integrally formed end walls 36 located perpendicular thereto. The end walls 36 of longitudinally aligned and adjacent seals 22 and 24 facewise abut one another, whereas the end walls 36 located at the ends of the outermost seals 22 and 24 facewise abut the end walls 18 of the housing 14. Formed integral with the backwalls 28 of each of the seals 22 and 24 are inflation ports 38 which project through the sidewalls 16 of the housing 14 and into the interior of the trapezoidal 4. Those seals 22 and 24 at which abrupt contours are anticipated may be provided at the juncture of their bottom walls 26 and oblique walls 32 with slits 40 (FIGS. 3 and 4) formed by abutting slit walls 42 which are integrally connected to the bottom walls 26 and corresponding oblique walls 32 and through their arcuate margins 34 and are further connected to one another at their inwardly presented margins located within the seals 22 and 24 so that the seals 22 and 24 in which they are formed remain airtight.

Figure 2:
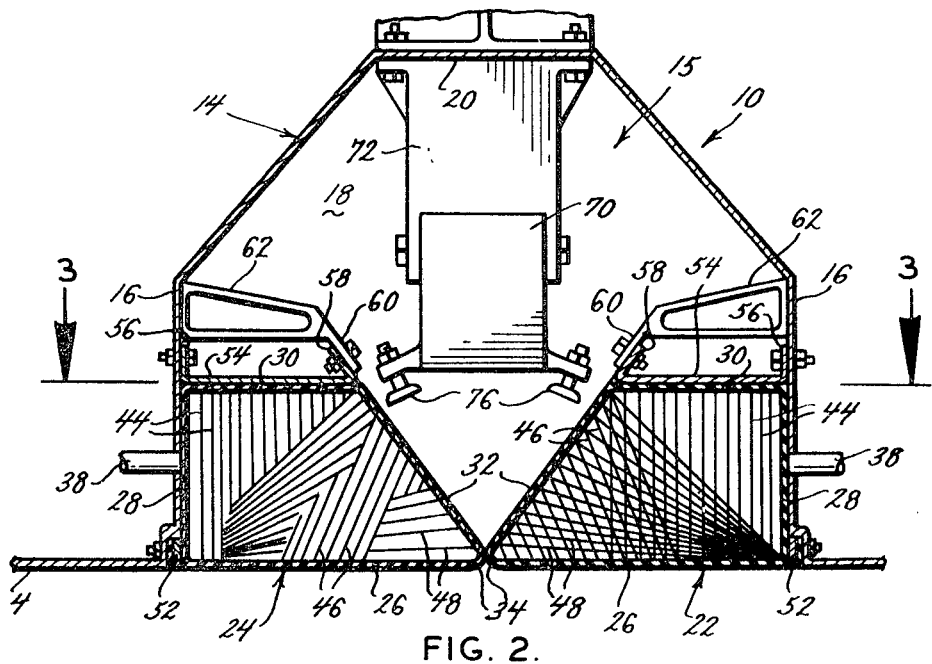
FIG. 2 is a sectional view taken along line 2—2 of FIG. 1.

To retain the seals 22 and 24 in their normal trapezoidal shape under elevated pressures and yet still have the walls 26 and 32 resilient enough to give locally, shape-retaining cross threads traverse the interior of the seals 22 and 24 and are embedded in the various walls thereof (FIG. 2). In particular, one group of threads 44 extends vertically through the interior of the seal 22 or 24 and interconnects the upper and lower walls 20 and 26 thereof, while another group of threads 46 extends obliquely interconnecting the bottom wall 26 and the oblique wall 32. A further group of threads 48 radiates from the juncture of the bottom and the backwalls 26 and 32 and those threads are embedded at their opposite ends across the inner face of the oblique wall 36. Still another group of threads 50 (FIG. 3) extends diagonally across the corners formed by the juncture of the end walls 36 and the backwall 28, the threads 50 being embedded in each of those walls. As previously noted, the threads 44–50 permit the use of relatively thin an flexible material for the walls 26 and 32 so that those walls will give in the presence of applied forces, yet they prevent the walls 26, 32 and 36 from ballooning outwardly into an oval or curvilinear shape when air under elevated pressure is introduced into the seals 22 or 24.

The bottom wall 26 of each seal 22 or 24 continues beyond its corresponding backwall 28 in the provision of an integrally formed lip 51 which is bonded to a mounting bar 52. With the seals 22 and 24 folded downwardly the bars 52 are bolted against one of the sidewalls 16 of the housing 14 so that the end portions of the lips 51 are captured between the bars 52 and the sidewalls 16 (FIG. 7). Similarly, the upper wall 30 of each seal 22 or 24 is bonded against a separate mounting plate 54 having a vertical flange 56 which is bolted to the sidewall 16 of the housing 14 and an oblique flange 58 which forms a continuation of the oblique wall 32. The oblique flange 58 in turn is bolted to a downwardly extending lip 60 on a triangular support bracket 62 which overlies the plate 54 and has one of its legs also secured against the sidewall 16 of the housing 14.

The seals 22 and 24 are inflated through their inflation ports 38 which are connected to an accumulator or reservoir in the aircraft 2 through suitable valving, pressure regulators, tubing, and the like. The reservoir may be merely a bottle of high-pressure air or some other gas, in which case it is filled prior to the departure of aircraft 2, or it may be supplied with engine bleed air from an air takeoff on the compressor of the aircraft engine.

The cavity 15 also contains an ejector rack 70 located above the seals 22 and 24 and normally obscured thereby. The rack 70 attaches to the rocket 12, and is in turn suspended form the top wall 20 of the housing 14 by means of a pair of support brackets 72. The rack 72 has hooks 74 and sway brace pads 76, the former of which engage lugs 78 on rocket 12 to secure the rocket 12 to the rack 72. The pads 76 are adjustable in order that the rocket 12 may be held securely on the hooks 74. The rack 70 is also provided with ejector pistons (not shown) for propelling the rocket 12 away from the mount 10. The exact construction of the rack 70 is not critical and, indeed, any suitable rocket or bomb-supporting device may be employed as long as it possesses sufficient strength to support the rocket 12 and is small enough to fit within the cavity 15 without interfering with the seals 22 and 24. Accordingly, the rack 70 will not be described in further detail.

The rocket 12 has a cylindrical body portion 80 which at one end merges into a generally conical nose portion 82 and at its opposite end terminates at a discharge nozzle 84. The rear half of the body portion 80 has four fins 86 projecting radially therefrom at 90° intervals. One of the fins 86 is disposed to the rear of and generally in alignment with the lugs 78 on the rocket body portion 80.

To install the rockets 12 in the mount 10, the seals 22 and 24 are evacuated, causing them to completely collapse, and then the rocket 12 is raised into the cavity 15 and maneuvered until the hooks 74 on the ejector rack 70 engage the lugs 78. The diameter of the rocket 12 and the positioning of the ejector racks 70 relative to the seals 22 and 24 and to the skin of the fuselage 4 are all such that the laterally projecting fins 86 of the rocket 12 will be presented slightly below the bottom walls 26 on the seals 22 and 24 and similarly below the skin of the fuselage 4. One of the other fins 86 will, of course, project downwardly, while the remaining fin 86 will project upwardly and will be contained entirely within the cavity 15.

Prior to the departure of the aircraft 2 air is admitted to the seals 22 and 24 until the pressure therein reaches approximately 5 p.s.i.g. In this condition (FIGS. 1 and 6) the seals 22 and 24 will snugly engage and envelope the body portion 8 and nose portion 82 above the laterally projecting fins 86, leaving only the approximate lower half of the body portion 80 and nose portion 82 exposed beyond the fuselage 4. Moreover, the moldline or continuation of the fuselage skin continues unobstructed up to the rocket 12, at which point it merges into the exposed surfaces of the rocket 12 with few abrupt changes in contour. This is particularly true at the nose portion 82 which emerges from the enveloping seals 22 and 24 as a gentle taper. That taper leads up the the body portion 80 which is exposed beyond the seals 22 and 24 as a semicylindrical surface and as such it does not create the abrupt changes in the aircraft moldline associated with conventional exposed pylons and mounting structures.

By employing a plurality of seals 22 and 24 in endwise abutment as disclosed herein, the bottom walls 26 and arcuate edges 34 thereof conform better to the contoured surface of the rocket 12 as well as to the surfaces of other rockets and loads of more pronounced contour. The slits 40 in the individual seals 22 and 24 aid in achieving substantially complete conformity with the contoured surface of the rocket 12 or other loads. Also, should one of the seals 22 or 24 develop a leak, only a relatively small portion of the aircraft moldline will be distorted, since the remaining seals 22 and 24 will remain in their proper configuration and serve their purpose.

The inflated seals 22 and 24 furthermore tend to laterally stabilize the rocket 12 on the mount 10 by reason of the fact that they bear against both sides of the rocket 12 in direct opposition to one another. Consequently, the need for heavy sway bracing on the ejector rack 70 is eliminated.

The rocket 12 is, of course, ejected by disengaging the hooks 74 on the ejector rack 70 from the lugs 78 on the rocket 12 and simultaneously energizing the ejector pistons (not shown) on the rack 70 so that the rocket 12 is propelled downwardly out of the cavity 15. Once the upstanding fin 86 on the rocket 12 clears the lower margin of the housing 14, its motor will propel it forwardly to the target. Contemporaneously with the release of the hooks 74 on the ejector rack 70, the valves associated with the accumulator will open allowing high-pressure air to enter the seals 22 and 24 for the purpose of restoring them to their original trapezoidal shape. The valves should remain open until the pressure within the seals is again restored to approximately 5 p.s.i.g. The restoring force imparted to the seals by reason of the pressurized air contained within them will further assist in ejecting the rocket 12 from the cavity 15, thereby assuring a clean break with the housing 16 before the ignited rocket motor generates enough thrust to propel the rocket forwardly. Once the rocket clears the seals 22 and 24 they will assume their original trapezoidal shape wherein their bottom walls 26 form an uninterrupted continuation of the skin on the fuselage 4. In other words the moldline remains smooth across the mounts 10 and is not interrupted by various cavities in the aircraft fuselage as is the case with conventional semisubmerged mountings which have been relieved of their loads.

While the mount 10 disclosed herein is specifically designed for carrying rockets 12, it should be understood that the mount 10 can be employed to carry other types of loads such as bombs, fuel tanks, and similar containers.

This invention is intended to cover all changes and modifications of the example of the invention herein chosen for purposes of the disclosure which do not constitute departures from the spirit and scope of the invention.

What is claimed is:

1. A mount for selectively securing loads such as weapons and other stores to an aircraft; said mount comprising a housing partially defining a cavity which extends inwardly into the aircraft from the outer surface thereof, load-securing means for holding a load on the aircraft such that a portion of it is within the cavity and another portion of it projects beyond the outer surface of the aircraft, and inflatable seals secured to the housing and extending across the cavity in the absence of a load in the cavity and when inflated so as to close the cavity when the load is detached from the load-securing means, each seal comprising a first wall presented outwardly, a second wall located in spaced relation to the first wall, a third wall interconnecting the first and second walls, and flexible restraining means connected to the first and second walls and traversing the interior of the seal to prevent the first and second walls from ballooning away from each other when the seal is inflated, one of the seal walls being mounted rigid with respect to the housing.

2. A mount according to claim 1 wherein each seal is further provided with a fourth wall interconnecting the first and second walls in spaced relation to the third wall, and wherein flexible restraining means traverse the interior of the seal and interconnect the fourth wall with one of the other walls.

3. A mount according to claim 2 wherein the fourth walls are oblique to the outer walls, and wherein the inflatable seals are mounted at opposite sides of the cavity, and wherein the fourth walls on opposed seals converge toward one another and engage each other adjacent to their juncture with the first walls when a load does not otherwise distort them.

4. A mount according to claim 2 wherein each of the opposed seals is at least two individual seal segments arranged in longitudinal alignment and in endwise abutment, wherein the individual seal segments have abutting end walls extending across their first, second, third, and fourth walls, and wherein flexible restraining means extend diagonally between the end walls and the third walls.

5. A mount for securing loads to an aircraft; said mount comprising a housing contained within the aircraft and having sidewalls which extend inwardly from the outer surface of the aircraft, the housing defining a cavity which opens outwardly of the aircraft; load-supporting means in the housing for engaging the load and holding it in a substantially fixed position partially within and partially outside the cavity, whereby the load will project beyond the outer surface of the aircraft, the load-supporting means engaging that portion of the load located within the housing; and opposed seals positioned against the housing sidewalls and having substantially hollow interiors which contain fluid maintained at a pressure greater than the surrounding atmospheric pressure so that the opposed seals tend to expend to their original configuration when deformed, each seal further having an outwardly presented wall which is substantially flush with and forms a continuation of the outwardly presented surface on the aircraft, a backwall connected to the outwardly presented wall and extending inwardly therefrom adjacent to one of the sidewalls of the housing, at least one other wall extending between the backwall and the outwardly presented wall, and flexible restraining means located within the interior of the seals and connected to the outwardly presented wall and to at least one of the other seal walls so that the outwardly presented wall will not balloon outwardly under the pressure exerted by the pressurized fluid, the opposed seals being engaged with and deformed against the load retained by the load securing means so that the interior of the housing is substantially isolated from the airstream flowing over the exterior of the aircraft and the aircraft moldline is streamlined, the opposed seals expanding under the restoring forces exerted by the pressurized fluid contained therein and in combination extending across and substantially closing the cavity when the load is released from the load securing means so that the seals occupy the space formally occupied by the load, whereby in the absence of a load in the cavity the interior of the housing is still isolated from the airstream flowing along the aircraft and the aircraft moldline remains streamlined.

6. A mount according to claim 5 wherein the flexible restraining means are connected between the outwardly presented wall and the backwall, and between the outwardly presented wall and the wall connecting the backwall and the outwardly presented wall.

7. A mount for securing loads to an aircraft; said mount comprising a housing contained within the aircraft and having sidewalls which extend inwardly from the outer surface of the aircraft, the housing defining a cavity which opens outwardly of the aircraft; load-supporting means in the housing for engaging the load and holding it in a substantially fixed position partially within and partially outside the cavity, whereby the load will project beyond the outer surface of the aircraft, the load-supporting means engaging that portion of the load located within the housing; and opposed seals positioned against the housing sidewalls and having substantially hollow interiors which contain fluid maintained at a pressure greater than the surrounding atmospheric pressure so that the opposed seals tend to expand to their original configuration when deformed, each seal further having an outwardly presented wall which is substantially flush with and forms a continuation of the outwardly presented surface on the aircraft, a backwall connected with the outwardly presented wall along one of its margins and extending inwardly therefrom adjacent to one of the sidewalls of the housing, and an oblique wall connected to the outwardly presented wall along its other margin and forming a longitudinal inner edge along the one side of the seal, the included angle between the oblique wall and the outwardly presented wall being acute and the inner edges on the opposed seals being juxtaposed when the seals are expanded in the absence of a load in the cavity, the opposed seals being engaged with and deformed against the load retained by the load securing means so that the interior of the housing is substantially isolated from the airstream flowing over the exterior of the aircraft and the aircraft moldline is streamlined, the opposed seals expanding under the restoring forces exerted by the pressurized fluid contained therein and in combination extending across and substantially closing the cavity when the load is released from the load-securing means so that the seals occupy the space formally occupied by the load, whereby in the absence of a load in the cavity the interior of the housing is still isolated from the airstream flowing along the aircraft and the aircraft moldline remains streamlined.

8. A mount according to claim 7 wherein each seal further includes an inwardly presented wall located in inwardly spaced relation to the outwardly presented wall and interconnecting the backwall and the oblique wall.

9. A mount according to claim 8 and further characterized by rigid support means mounted in fixed and determined relation with respect to the housing side walls; and wherein the inwardly presented seal walls are fastened to the support means.

10. A mount according to claim 8 wherein each seal further includes flexible restraining means located within its interior and connected to the outwardly presented wall and to at least one of the other walls so that the outwardly presented wall will not balloon outwardly under the force exerted by the pressurized fluid in the seal.

11. A mount for securing loads such as weapons or other stores to an aircraft having walls which define a load-receiving cavity opening out of the outer surface of the aircraft; said mount comprising load-supporting means in the cavity for engaging the load and holding it in a position partially within and partially outside the cavity, whereby the load will project beyond the outer surface of the aircraft, seals secured to the aircraft on opposite sides of and within the cavity, the seals including impervious flexible materials having substantially hollow configurations and inflatable in the cavity to positions wherein they close the entrance to said cavity and substantially conform to the outer surface of the aircraft, and means for supplying a pressurized fluid to the interior of the seals for inflating the seals, the seals further being positioned such that they are partially deformed inwardly into the cavity by the load and forcibly bear against the inwardly presented side of the load when the load is engaged and held by the load-supporting means so that the inflated seals when so deformed urge the load away from the aircraft.

12. A mount according to claim 11 wherein the opposed seals are positioned to further exert opposed and substantially equal laterally directed forces on the load which tend to stabilize the load in the cavity.